UNITED STATES PATENT OFFICE 2,123,317

MAKING COLORED PLATES FROM MIXTURES OF HYDRAULIC BINDING AGENTS AND FIBROUS SUBSTANCES

Stefan Schiess, Freiburg in Breisgau, Germany

No Drawing. Application April 22, 1936, Serial No. 75,903. In Germany April 26, 1935

8 Claims. (Cl. 25—155)

The present invention relates to a process for making colored plates for covering roofs, floors and walls of mixtures of hydraulic binding agents and fibrous materials.

It is known to make plates for roof coverings and so forth from mixtures of asbestos and cement with much water. When attempts were made to color these mixtures then considerable quantities of the coloring material were always washed away with the excess water in the course of the production of the plates. Furthermore a veiling which clouded or darkened the true color formed on asbestos-cement plates, which had been made from the aqueous mixture on pulp machines, during the setting thereto.

According to the present process it is possible to obtain plates which are colored through and through without any loss of the coloring material and without the plates exhibiting any blooming. A perfectly uniform mixture of asbestos and cement and a complete disintegration of the asbestos is attained thereby without the asbestos fibre being damaged.

According to the invention first of all asbestos, cement and coloring material are rubbed up together dry but are not ground, and thereupon a small quantity of water is admixed, most simply by spraying or converting into a mist, which does not exceed on an average 5% of the cement used, whereupon the mixture is passed through centrifugal mills or comminuting devices for the complete disintegration of the asbestos fibres.

The quantity of water added in the form of a mist or spray must be so large that the cement and asbestos adhere to one another and do not separate at 1,700 rotations and more per minute. A complete disintegration even of the smaller varieties of asbestos is attained in the centrifugal mill and an end product is obtained having a wool-like loose quality which can be introduced into the moulds in uniform layers, the fibres taking up a position parallel to one another, so that they impart to the cement the maximum bending strength which is attainable by them. The mixtures are then pressed in the moulds to plates, and the pressed plates, which may be stored for a long time since there is no setting to fear, finally introduced between moistened cloths, plates of cardboard, paste board or the like for setting purposes.

The quantities of water used in the former processes were always so large that the moistened mixture formed lumps and therefore could not be sent through centrifugal mills for the careful and non-impairing disintegration of the asbestos and production of uniform mixtures.

If mixtures are prepared with different coloring materials then plates with differently colored layers can be obtained, the wool-like loose mixtures coming from the centrifugal mills being introduced layer-wise one after the other into the moulds.

Whereas in the methods used in paper technique it was not possible to use cements of high density, e. g. fusion cement and bauxite cement, since a separation of the cement from the asbestos took place in the water owing to the high density, such cements can be forthwith used according to the present invention.

Since no settling is to be feared, one can also add, for example for making floor covering plates which have to possess an enhanced resistance towards wear and to be non-slip, quartz or corundum in the form of granules to the mixture of asbestos, cement and coloring material as it comes from the centrifugal mill.

When wall plates are being made according to this invention, these do not need to be so resistant as roofing plates or floor covering plates, so that a part of the cement can be replaced by slaked lime. Since the slaked lime must be hardened with carbonic acid the whole hardening of the pressed wall plates may be carried out in an environment of sufficiently moist carbonic acid. The separate setting between moist plates of cardboard or the like or between moist cloths is dispensed with thereby.

The storage of asbestos cement-plates in carbonic acid chambers for the purpose of converting the free lime into calcium carbonate in the cement is known.

Insofar as these asbestos-cement plates made on the pulping machine to be converted into calcium carbonate have been colored, the coloring existed only in a colored coating of 1 to 2 mm. thick.

The particular technical superiority of the plates to be prepared according to this invention consists in the facts that they are uniformly colored throughout the whole cross section, that they are free from efflorescence and can be polished without previous veiling since they possess only very few pores. Accordingly they absorb only 7% of water as compared with the 18% which was absorbed by the asbestos-cement plates hitherto commercially available. From this it is seen that they are about three times as resistant towards frost and other atmospheric influences as the hitherto known asbestos-cement plates, which they also surpass in hardness. It is also important that the loss of material which amounted up to 15% in the pulping process is eliminated in the mode of production according to the present invention.

The mixtures according to the present invention issuing from the centrifugal mills may also be pressed into suitable moulds to form household articles, e. g. cups, trays, ash bowls, buttons, knobs and so forth. In this case it is advisable to coat the hardened articles with paraffin or a cellulose ester varnish.

Examples

1. For the purpose of making roofing plates, for example 80 parts of cement are mixed with 5 parts of coloring material or pigment and 15 parts of asbestos, 4 parts of water are added thereto by fine spraying, the mixture is passed through a centrifugal mill and then falls into 30 mm. high shapes which are compressed by hydraulic presses to a thickness of 4 mm. The shapes prepared in this way are caused to set between moist cardboard or the like plates.

2. In order to make floor covering plates, for example 80 parts of cement are mixed with 12 parts of asbestos and 4 parts of coloring material, 4 parts of water are added in the form of a mist or very fine spray, and the mixture is passed through the centrifugal mill. Thereupon 25 parts of quartz having a granule size of on an average 1 mm. are added to the woolly mixture in a mixing machine, whereupon the mixture is filled into 30 mm. high shapes and compressed to plates 10 mm. thick, which are then caused to set between moist layers.

3. In order to make wall covering plates, for example 15 parts of cement are mixed with 10 parts of asbestos, 75 parts of slaked lime and 2 parts of pigment or coloring material, 5 parts of water are then added in the form of a fine spray and the mixture is sent through centrifugal mills and introduced into shapes of 40 mm. height in which it is compressed to a thickness of 8 mm. The resulting plates are placed in chambers and hardened by means of carbonic acid made by burning coke and led over moist limestone pieces for purification purposes.

What I claim is:

1. A method of making colored articles like plates for covering roofs, floors and walls, and colored household articles like cups, knobs, etc., from mixtures of hydraulic binding agents and fibrous materials consisting in treating with only about 5% of water a mixture of cement with asbestos and coloring material, loosening up the whole to a dry uniform mixture, pressing the mixture into shapes, and causing the shaped pieces to set by placing them between moist surfaces.

2. A method of making colored articles like plates for covering roofs, floors and walls, and colored household articles like cups, knobs, etc., from mixtures of hydraulic binding agents and fibrous materials consisting in treating with only about 5% of water a mixture of high specific gravity cement with asbestos and coloring material, loosening up the whole to a dry uniform mixture, pressing the mixture into shapes, and causing the shaped pieces to set by placing them between moist surfaces.

3. A method of making colored articles like plates for covering roofs, floors and walls, and colored household articles like cups, knobs, etc., from mixtures of hydraulic binding agents and fibrous materials consisting in treating with only about 5% of water a mixture of fusion cement with asbestos and coloring material, loosening up the whole to a dry uniform mixture, pressing the mixture into shapes, and causing the shaped pieces to set by placing them between moist surfaces.

4. A method of making colored articles like plates for covering roofs, floors and walls, and colored household articles like cups, knobs, etc., from mixtures of hydraulic binding agents and fibrous materials consisting in treating with only about 5% of water a mixture of bauxite cement with asbestos and coloring material, loosening up the whole to a dry uniform mixture, pressing the mixture into shapes, and causing the shaped pieces to set by placing them between moist surfaces.

5. A method of making colored articles like plates for covering roofs, floors and walls, and colored household articles like cups, knobs, etc., from mixtures of hydraulic binding agents and fibrous materials consisting in treating with only about 5% of water a mixture of cement with asbestos and coloring material, loosening up the whole to a dry uniform mixture, incorporating quartz in granule form with the mixture, pressing the mixture into shapes, and causing the shaped pieces to set by placing them between moist surfaces.

6. A method of making colored articles like plates for covering roofs, floors and walls, and colored household articles like cups, knobs, etc., from mixtures of hydraulic binding agents and fibrous materials consisting in treating with only about 5% of water a mixture of cement with asbestos and coloring material, loosening up the whole to a dry uniform mixture, incorporating corundum in granule form with the mixture, pressing the mixture into shapes, and causing the shaped pieces to set by placing them between moist surfaces.

7. A method of making wall covering plates from mixtures of hydraulic binding agents and fibrous materials consisting in treating with only about 5% of water a mixture of cement, slaked lime, asbestos and coloring material, loosening up the whole to a dry uniform mixture, pressing the mixture into shapes, and causing the shaped pieces to set by treating them with moist carbonic acid.

8. A method as claimed in claim 1 in which the set article is provided with a water tight coating.

STEFAN SCHLESS.